April 12, 1932.  W. G. PRENTICE ET AL  1,853,146
TIRE MACHINE
Filed Aug. 17, 1931  8 Sheets-Sheet 1

INVENTORS
William G. Prentice
Frank B. Copeland
BY Fisher, Moser and Moser
ATTORNEY April 12, 1932.   W. G. PRENTICE ET AL   1,853,146
TIRE MACHINE
Filed Aug. 17, 1931   8 Sheets-Sheet 4

INVENTORS
William G. Prentice
BY Frank D. Copeland
Fisher,
ATTORNEY

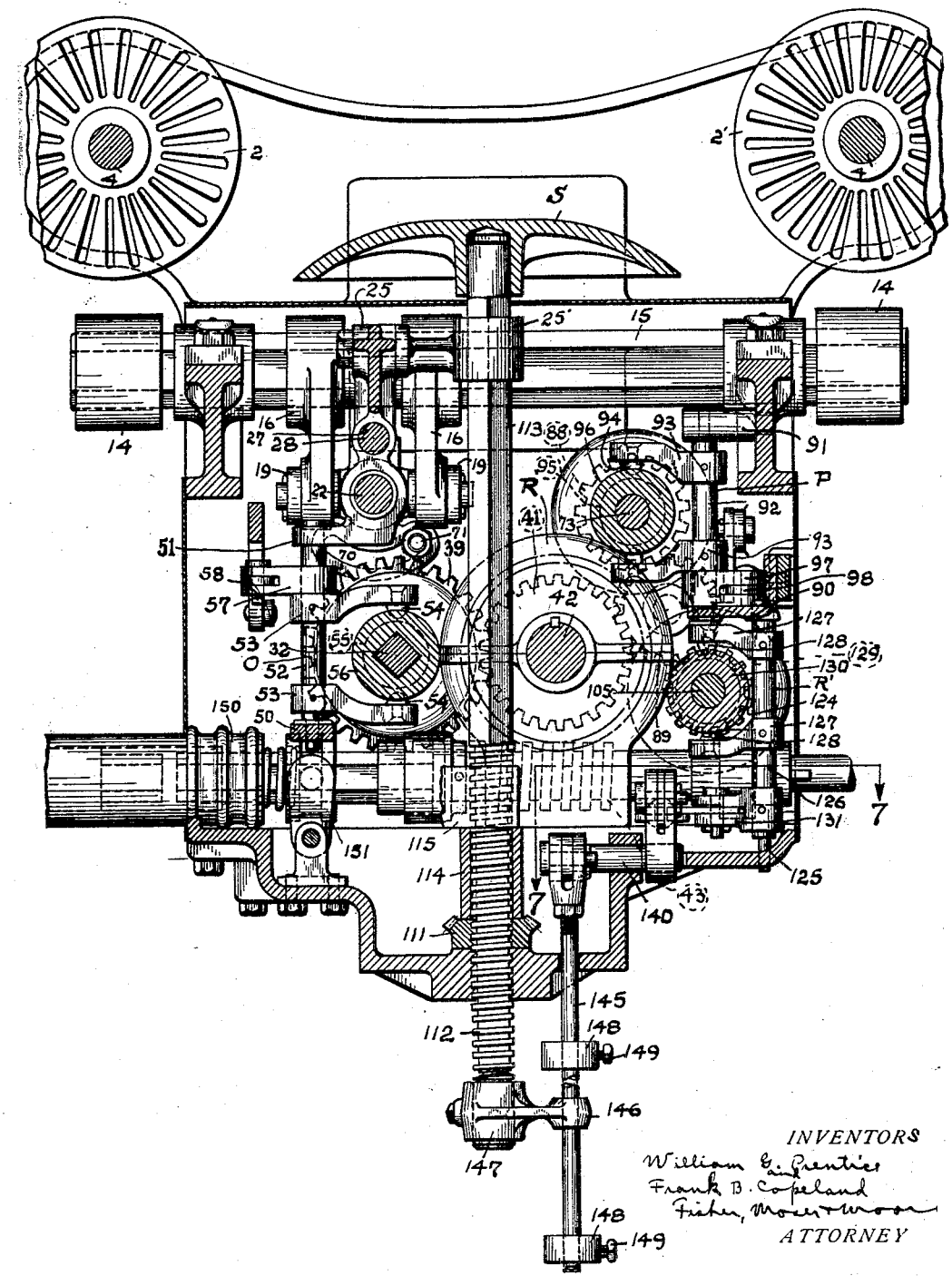

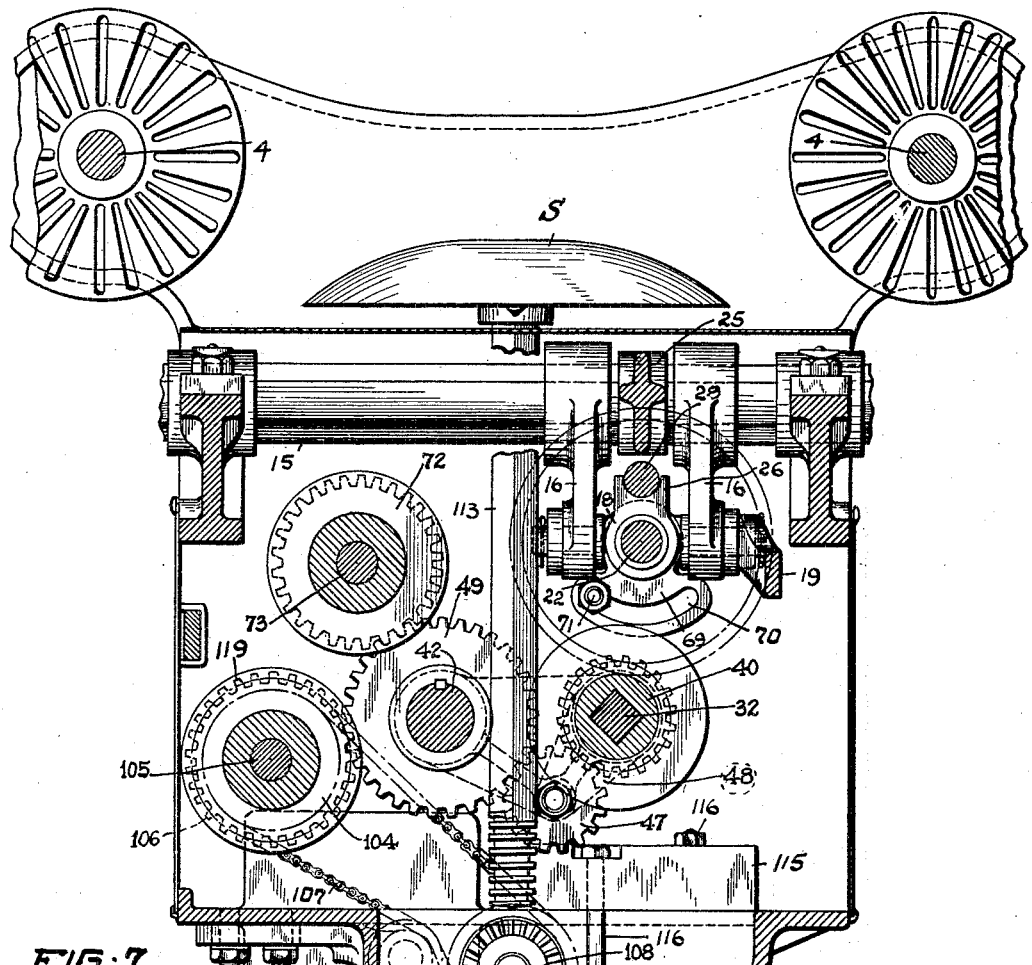

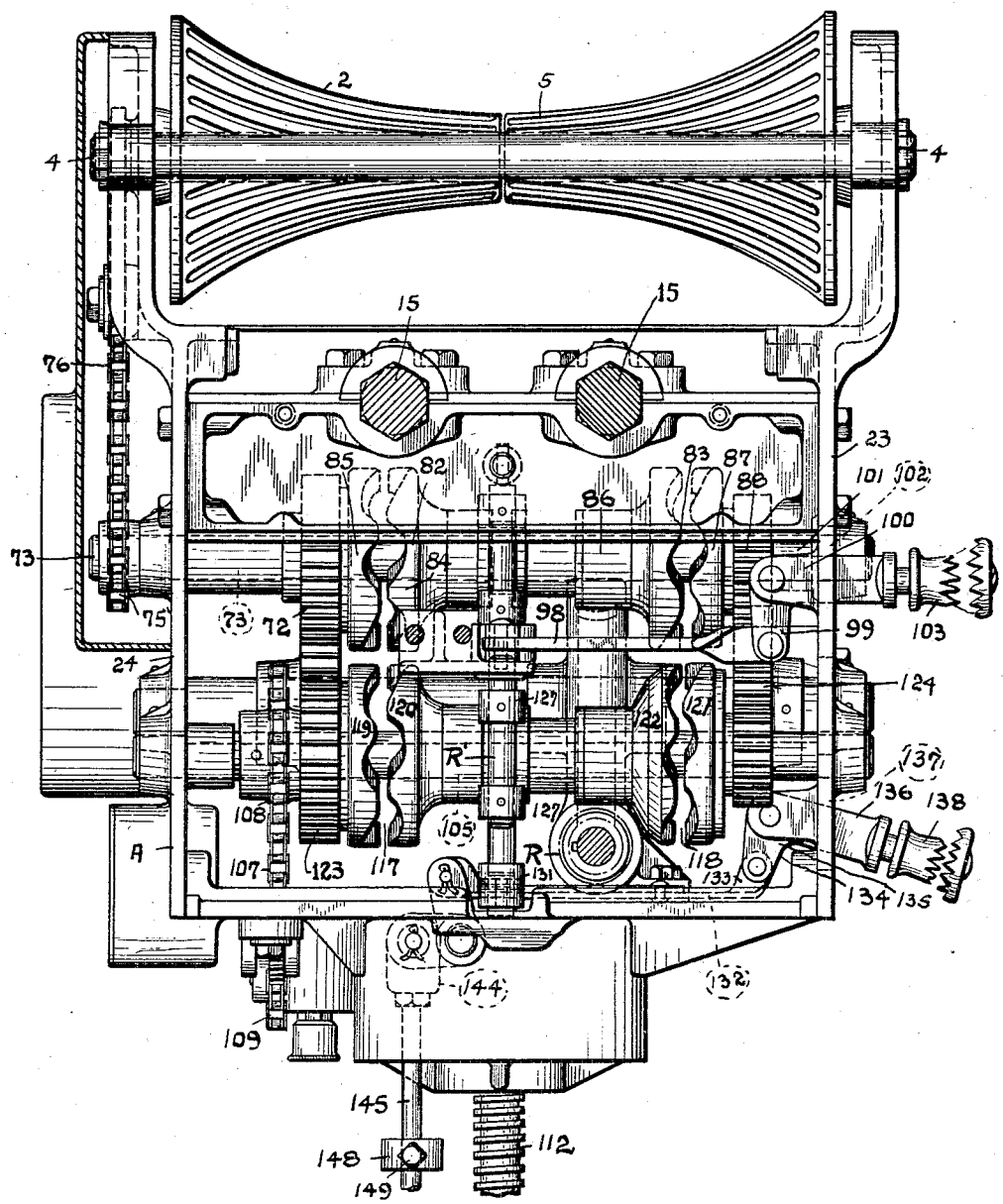

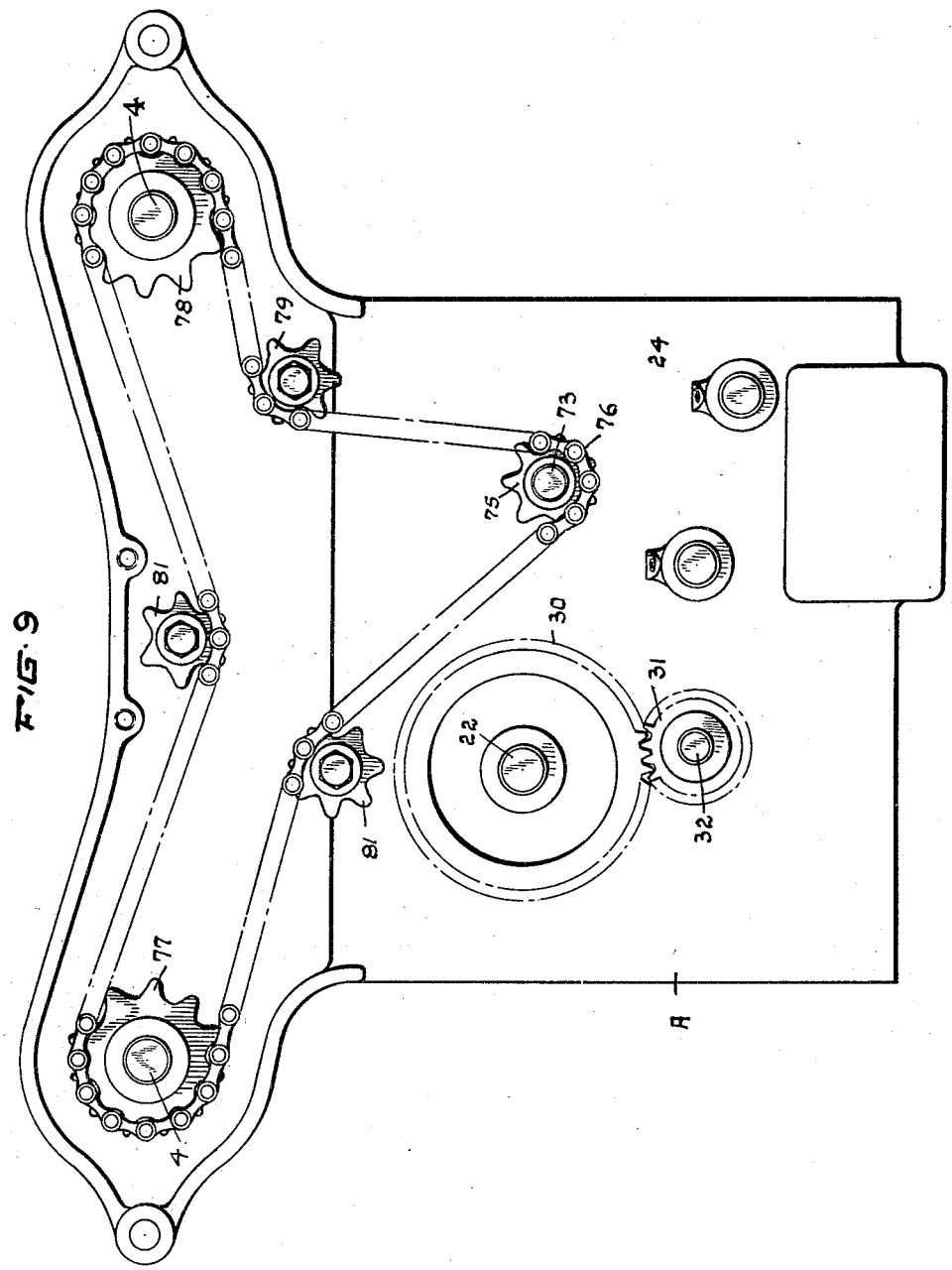

Patented Apr. 12, 1932

1,853,146

UNITED STATES PATENT OFFICE

WILLIAM G. PRENTICE, OF NORTH PLAINFIELD, NEW JERSEY, AND FRANK B. COPELAND, OF ASHLAND, OHIO, ASSIGNORS TO THE ELITE MANUFACTURING COMPANY, OF ASHLAND, OHIO, A CORPORATION OF OHIO

TIRE MACHINE

Application filed August 17, 1931. Serial No. 557,676.

The present invention relates to tire machine, and the primary purpose of the invention is to provide a motor driven machine adapted to facilitate the opening and inspection of a tire casing and the repair of any defects or injuries therein. Accordingly, the machine is particularly constructed to support a split tire and casing in a vertical plane and on its tread, and to open or spread a sector of the tire in lesser or greater degree, and then to revolve the tire while it is spread open and held open, thereby openly exposing the interior of the tire, step by step, and sector by sector, circumferentially of the tire. The machine also embodies a power operated presser member or repair shoe arranged centrally in respect to the revolving and spreading devices so that the tire after inspection may be supported and buckled inwardly in the sector to be repaired. The spreading devices, the revolving devices, and the presser member are arranged for individual and co-operative action by individual controlling means for each of said devices. The machine also includes an individually operable power actuated buffing wheel adapted to be used in repair operations while the tire is spread open and either stationary or revolving. The construction and arrangement of the working parts of the machine also permit the tire to be conveniently placed within the machine and readily removed therefrom, all as hereinafter more fully described and specifically pointed out in the appended claims.

Figure 1:
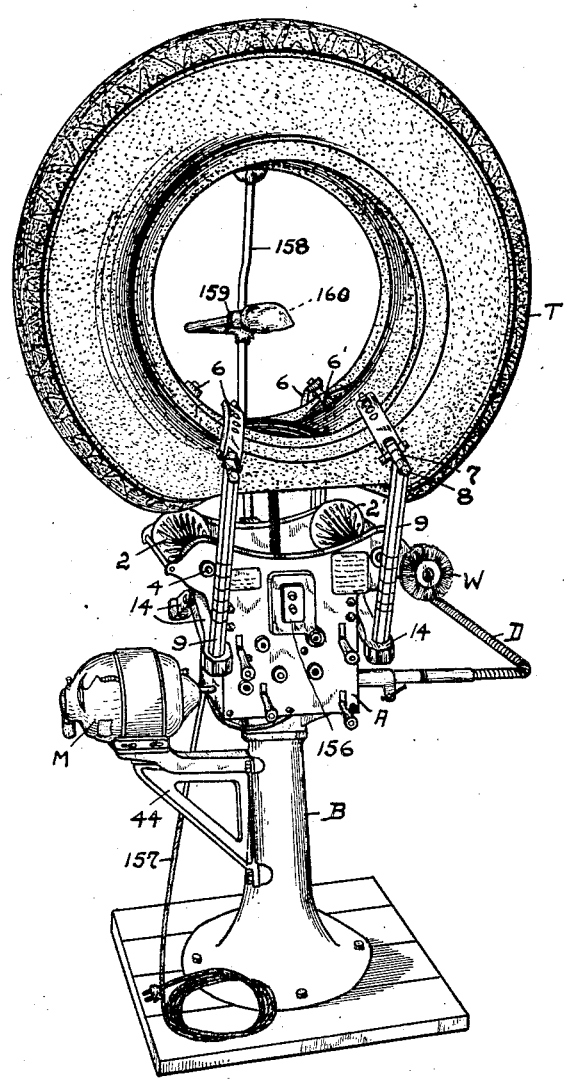
Figure 2:
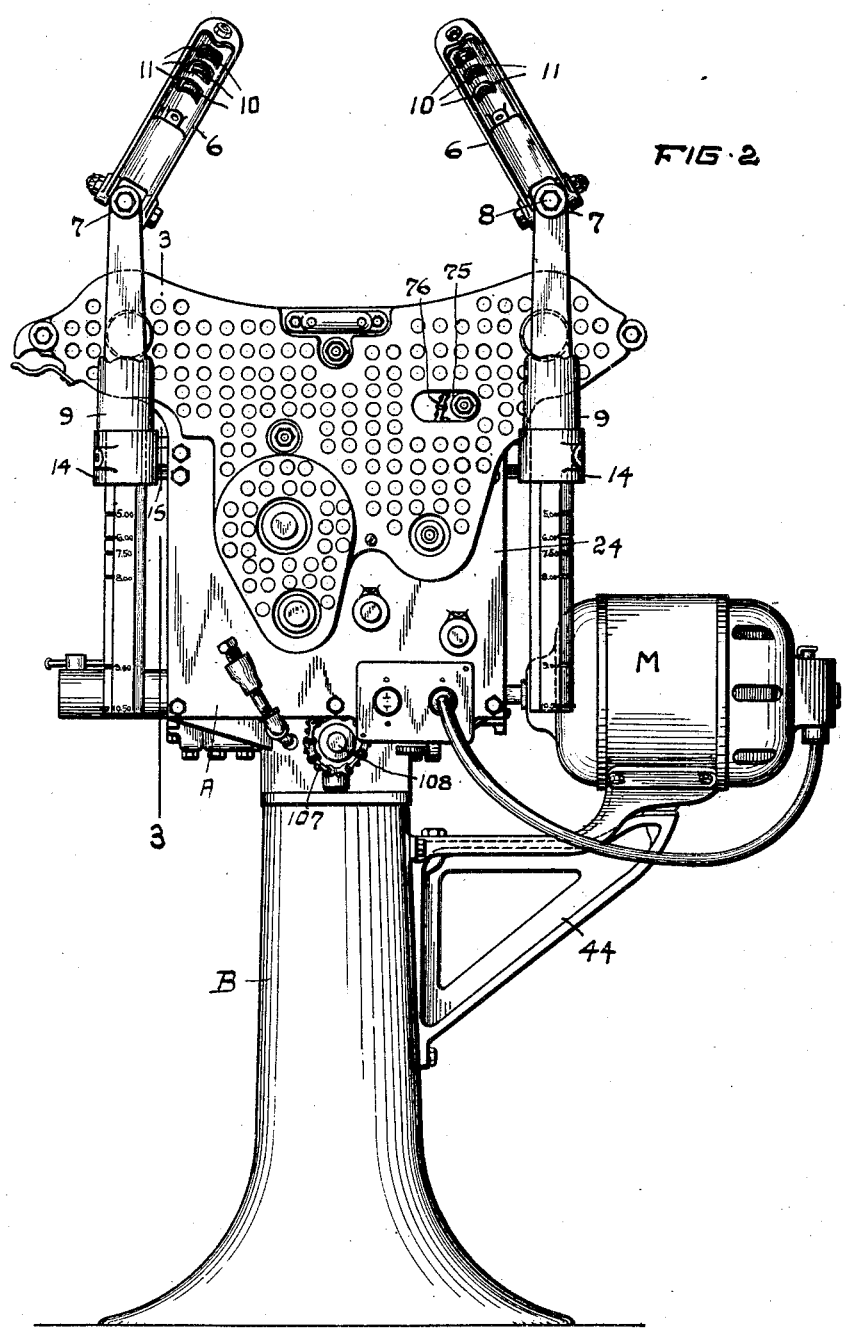
Figure 3:
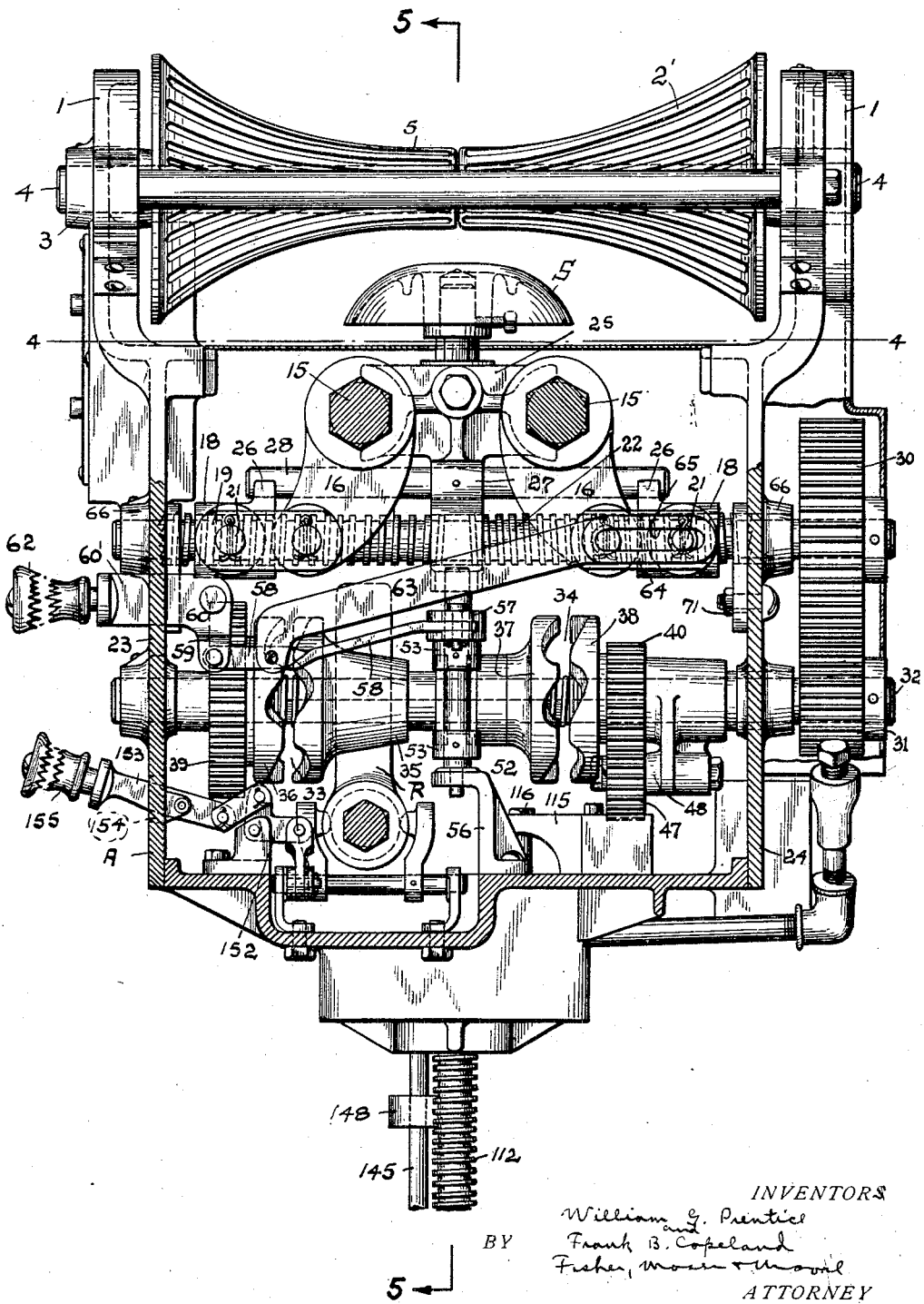
Figure 4:
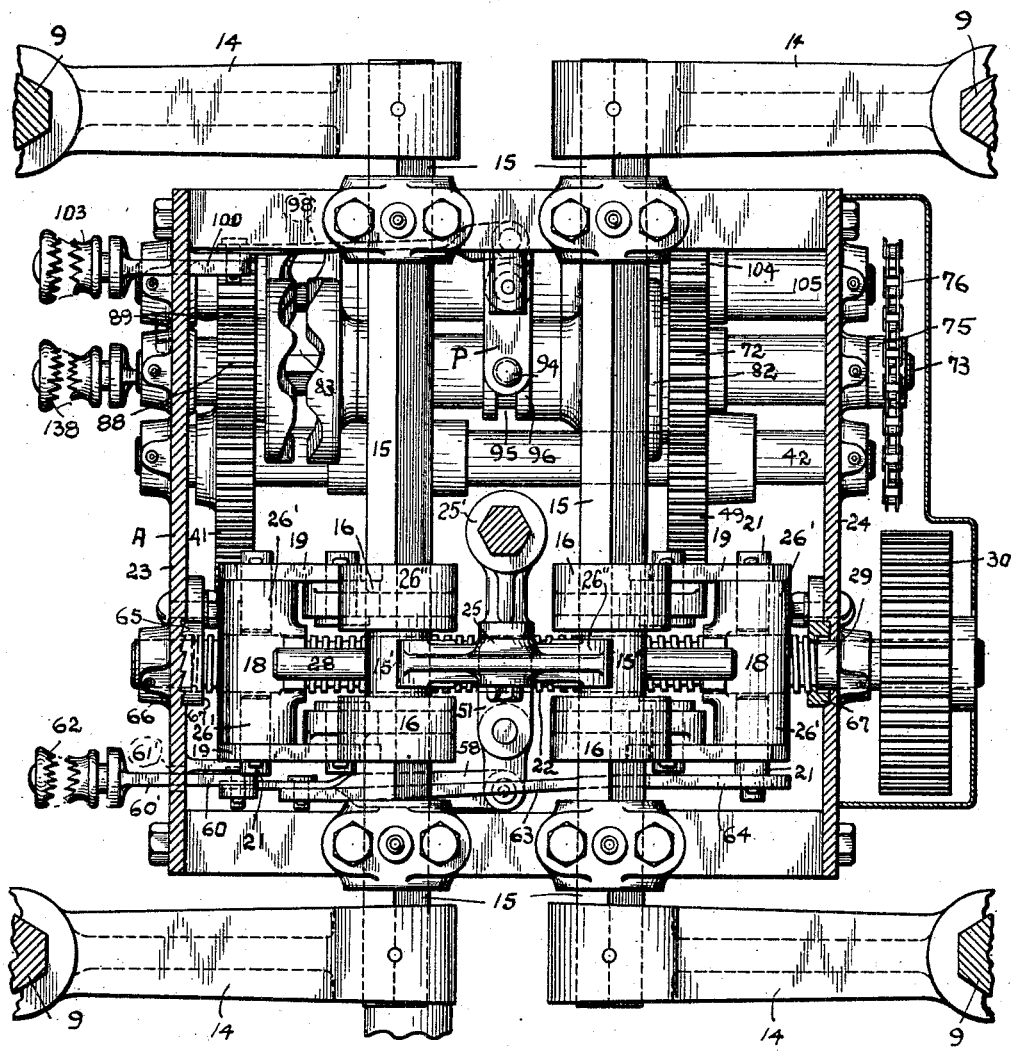
Figure 10:
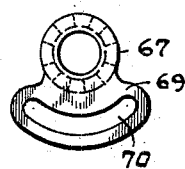
Figure 11:
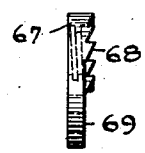

In the accompanying drawings, Fig. 1 is a perspective view of the front side of the machine with a tire supported therein. Fig. 2 is a rear view of the machine shown in Fig. 1. Fig. 3 is a vertical sectional view on line 3—3 of Fig. 2, and Fig. 4 a horizontal sectional view on line 4—4 of Fig. 3. Fig. 5 is a vertical sectional view on line 5—5 of Fig. 3, and Fig. 6 a vertical sectional view similar to Fig. 5 but looking in the opposite direction. Fig. 7 is a fragmentary sectional plan view on line 7—7 of Fig. 5. Fig. 8 is a vertical side view of the machine showing the drive mechanism for the roller and Fig. 9 an enlarged rear view of the machine with the cover removed to show the chain drive for the rollers. Figs. 10 and 11 are detail views of the adjusting nuts for the screw member.

Referring more particularly to the drawings, the machine comprises a frame A suitably mounted upon a pedestal B. A pair of elongated spool-shaped rollers 2—2′ are rotatably supported in an elevated position upon the top portion 1 of the frame, which is formed with journals 3 in which the shafts 4 of the rollers are journaled. The rollers are flanged or flared at their opposite ends and formed with reduced roughened cylindrical portions 5 adapted to centrally seat the head portion of a split casing or tire T, thus providing an efficient frictional driving means for revolving the tire when the latter is pressed to its seat on the rollers and both rollers are caused to revolve in the same direction.

The tire is pressed and held upright upon the driving rollers, and the tread portion of the tire T also caused to flatten itself in some degree upon the cylindrical portions 5 of the rollers by spreading and holding the divided base portions of the tire open and apart. The spreading devices include two pair of hinged brackets 6, one pair for each side of the tire, and arranged to swing in pairs, in opposing directions, directly above each roller and either substantially parallel therewith or inclined in respect thereto on converging lines. The bifurcated inner end of each bracket 6 is hinged to the inner end of a short arm 7 by a headed bolt 8, the outer end of which is pivotally adjustably secured to the upper end of a supporting or actuating rod 9. Brackets 6 carry rotatable finger elements 6′, which extend toward the driving rollers 2—2′, preferably toward the axis of the rollers and radially in respect to the tire, and the main body of each bracket 6 rotatably mounts a plurality of rollers 10, protruding through slots 11 in position to support the brackets upon and in anti-frictional engagement with the upper face or periphery of the tire T, all as clearly described in our co-pending application, Serial No. 545,450, filed July 19th, 1931. Each rod 9 is axially adjustably mounted in the outer end of an oscillatory lever or arm 14 the inner end of which is fixed to a rock shaft 15 of hexagonal cross section extending through and projecting at opposite ends from the frame or casing A. The levers 14 are arranged in pairs, one pair for each pair of rods 9, and there are two shafts 15, one for each pair of rock arms. The rock shafts 15 are coupled for conjoint movement in opposite directions. Thus, in the present instance each rock shaft 15 carries a pair of spaced short levers 16, which at their free end are linked to a nut member 18, by means of short and flat links 19. There are two nut members 18, one for each pair of levers 16, and each nut is provided with lateral extensions. 26' supporting short stud shafts 21 for pivotal connection with the links 19. The nuts are mounted on opposite ends of a screw member 22, arranged rectangularly to rock shafts 15 and rotatably mounted in the opposite walls 23—24 of frame A. The screw member 22 is provided at its front and rear ends with right and left hand threads respectively, so that rotation of member 22 causes the nuts 18 to travel in opposite directions. The rear end of member 22 is formed with a smooth portion 29 which extends through wall 24 and carries a gear 30 rigidly mounted thereon. The gear 30 meshes with a smaller gear 31 rigidly mounted on a shaft 32 arranged parallel to screw member 22 and guided in walls 23 and 24. A cross-shaped bracket 25, mounted in a manner hereinafter described, is formed with a recessed portion 27 in which a guide rod 28 is received and supported above and parallel to the screw member 22. Rod 28 engages within the recessed ear portions 26 of nuts 18 and hold the latter against rotary movement when member 22 is actuated. Bracket 25 is also formed with a pair of oppositely extending arms 26", which are recessed at their ends for the reception of cylindrical portions 15' formed on the rock shafts 15, which thus form supports for the bracket.

A pair of shiftable clutches 33 and 34 govern rotation of shaft 32 in either a clockwise or anti-clockwise direction. Clutch 33 embodies a clutch member 35 slidably and non-rotatably secured to shaft 32, and a second clutch member 36 co-operating with said first clutch member 35 and freely rotatable but non-slidably secured to said shaft. Clutch 34 embodies corresponding members 37 and 38, the first member slidably but non-rotatably secured to shaft 32 and the second member 38 being freely rotatable and non-slidably secured to said shaft. Each freely rotatable member of clutches 33 and 34 carries a gear 39 and 40 respectively. Gear 39 meshes with a gear 41 rigidly attached to the shaft 42 of a reduction unit R, driven from its worm drive shaft 43 by a motor M, mounted upon a bracket 44, attached to pedestal B, and gear 40 meshes with an idler gear 47 mounted on an integral arm 48 of clutch member 38, which idler in turn meshes with a second gear 49 rigidly attached to the shaft 42 of reduction unit R. Shifting of clutch members 35 and 36 respectively into operative or clutching position is effected by means of a yoke-shaped operating mechanism O pivotally mounted in a bracket 50 and a lateral extension 51 of bracket 25 previously mentioned. This mechanism includes a short shaft 52 having two lever arms 53 rigidly attached thereto, which arms 53 carry at their outer ends pins 54 engaging circular recess 55 of a sleeve member 56, slidably mounted on shaft 32. A third lever arm 57, also rigidly attached to shaft 52 extends in a direction opposite to that of lever arms 53 and is pivotally connected to the downwardly extending arm 59 of a bell crank 60, by means of a link 58. Bell crank 60 is pivotally supported in frame A and the free arm 60' thereof extends through a slot 61' in the front wall 23 of frame A and carries a handle 62 for manual operation, if so desired. A link 58, comprising a twisted bar pivotally supports a bar or rod 63, and the free end of this rod is slightly bent to provide a horizontal end portion 64, having a longitudinal slot 65 in turn slidably interengaged with the stud shaft 21 in extension 26' of outer nut 18. Slot 65 is so dimensioned and located that pin 21 engages the opposite ends thereof shortly before nuts 18 have been shifted in their outward movement close to the walls 23—24 respectively, or during their inward movement to a position adjacent the middle portion of screw 22, thus automatically disconnecting clutches 33 and 34. This disconnection of the clutches is caused by pin 21 actuating bar 63 in an appropriate direction, thereby causing operating mechanism O to disconnect one of clutches 33, 34.

It can readily be seen that when clutch member 35 is shifted into engagement with its corresponding member 36 shaft 32 will be rotated in a clockwise direction by means of gear 39 and gear 41 on shaft 42 of reduction unit R, in turn continuously driven by motor M. Shaft 32 drives the screw member 22 through gear 31 and gear 30, and nuts 18 on screw member 22 force rocking shafts 15 to turn in opposite directions. Shafts 15 impart movement to brackets 6 through levers 14 and rods 9 and brackets 6 in turn engage the opposite walls of the tire casing and continue to spread these walls as long as clutch members 35 and 36 engage with each other. Shortly before the utmost spreading position of the spreading rods 9 is reached the drive connection between clutch members 35 and 36 is automatically released so that no damage occurs if the operator does not release handle 62, governing the operating mechanism for the clutch members 35, 37. The return of the spreading rods 9 to their retracted position is effected by shifting handle 62 in an appropriate direction, so that clutch member 37 is shifted into engagement with its corresponding member 38 and shaft 32 is driven in an anti-clockwise direction through gear 40, idle gear 47, gear 49 and shaft 42 of reduction unit R.

The previously described means for tripping the operating mechanism O of the clutch mechanism acts during the return movement of the spreading device in a similar manner. Screw member 22 is axially shiftably supported in front and rear walls 23, 24, of frame A, thereby permitting very exact alinement of brackets 6 with respect to each other, which alinement is necessary to insure equal or uniform spreading of the opposite walls of the tire T. Thus, each wall of frame A includes a series of ratchet teeth 65' formed on the inner face of said walls encircling the bearing portions or members 66 for screw 22. These teeth co-operate with flat nut members 67 having screw-engagement with screw 22 close to the screw-threaded ends thereof. One face of each nut member 67 is formed with a series of teeth 68 corresponding to and adapted to engage with the teeth 65' in walls 23, 24 respectively. Each nut member 67 is also formed with an elongated circular slot 70, for receiving a screw bolt 71 which in turn rigidly clamps such nut member in longitudinally adjusted position. This longitudinal adjustment of screw member 22 is effected by first loosening the nuts 67, then adjusting screw member 22 to desired position and finally locking member 22 in place by screwing nuts 67 toward walls 23 and 24 respectively.

Revoluble movement of drive shaft 42 of reduction unit R, is also transmitted to the two spool shaped driving rollers 2—2'. Thus gear 49 rigidly mounted on shaft 42 and meshing with idler gear 47 also meshes with a gear 72 rotatably mounted on a cross shaft 73 in turn journaled in walls 23 and 24 of frame A. Cross shaft 73 extends through rear wall 24 of frame A and carries at its extending end a sprocket gear 75, engaging a sprocket chain 76 which drives sprocket gears 77, 78 respectively attached to the rear end portions of shafts 4. Sprocket chain 76 is guided by idler sprocket wheels 79, 80, and 81 suitably mounted in frame A. Cross shaft 73 carries two spring-pressed shiftable clutches 82 and 83, which govern rotation of said shaft in one or the other direction. Thus, clutch 82 embodies a clutch member 84 slidably and non-rotatably secured to shaft 73 and a second clutch member 85 co-operating with said first clutch member 84 and rotatably but non-slidably secured to said shaft. Clutch 83 embodies corresponding members 86 and 87, the first member being slidably but non-rotatably secured to shaft 73 and the second member 87 being rotatably but non-slidably secured to said shaft. Clutch member 84 of clutch 82 is rigidly connected with gear 72 so that shifting of the slidable clutch member 84 into engagement with member 85 couples shaft 73 with shaft 42 of reduction unit R. Clutch member 87 of shiftable clutch 83 is rigidly connected to a gear 88 coupled over with gear 41 on shaft 42 of reduction unit R by means of idler gear 89. Actuation of clutch 83 therefore causes shaft 73 to turn in one direction whereas actuation of clutch 83 forces shaft 73 to turn in an opposite direction. The clutch members 84 and 86 are shifted by a fork-shaped operating mechanism P, pivotally supported between a bracket 90, and a stud post 91, attached to frame A. Operating mechanism P is similar in construction and design to mechanism O for operating clutches 33, 34, previously described, and includes a short vertical shaft 92 having two lever arms 93 rigidly attached thereto. These arms 93 carry at their outer ends pins 94 engaging circular recess 95 of a sleeve member 96, slidably mounted on shaft 73. A third lever arm 97 also rigidly attached to shaft 92 extends in opposite direction to lever arms 93 and is coupled by means of a link 98 with the downwardly extending arm 99 of a bell crank 100, in turn pivotally mounted on a bracket 101 attached to frame A. The free arm of bell crank 100 extends through a slot 102 in front wall 23 of frame A, and carries a handle 103 for manual operation of the clutches 82, 83 respectively.

As will readily be understood a shifting of handle 103, in an appropriate direction, forces clutch member 84 of clutch 82 or clutch member 87 of clutch 83 into engagement with its corresponding clutch member, thereby turning shaft 73 correspondingly. Shaft 73 in turn transmits rotative movement to shafts 4 by means of the sprocket gear 75 and sprocket chain 76, thus rotating rollers 2—2' in the desired direction, and simultaneously revolving the tire T, supported on said rollers.

Rotary movement of shaft 42 of reduction unit R is finally utilized for raising or lowering a repair shoe or presser member S, which is mounted centrally within frame A, midway between the rollers 2—2', and guided in a perforated extension 25' of bracket 25. Shoe S is adapted to co-operate with brackets 6 in buckling and spreading the tire, to permit ready inspection and repair of punctures, or cuts, before releasing and removing the tire from the machine. Thus, gear 49, rigidly mounted on shaft 42 meshes with gear 104 rotatably mounted on cross shaft 105 journaled in walls 23 and 24 of frame A. Rigidly mounted upon the front end of cross shaft 105 is a sprocket gear 106 connected through chain 107 with a sprocket gear 109, in turn rotatably mounted on a stud shaft 108. Rigidly mounted on shaft 108 is a bevel gear 110, meshing with a bevel gear nut 111, in turn engaged with the lower screw-threaded portion 112 of a supporting rod 113 for presser shoe S. It can readily be seen that rotation of cross shaft 105 causes bevel gear nut 111 to rotate and thereby raise or lower presser foot S. The upward movement of nut 111 is checked by a sleeve 114 seated against nut 111 and backed by a bracket 115 rigidly attached to frame A by bolts 116. Cross shaft 105 includes two spring-pressed shiftable clutches 117 and 118 which govern rotation of said shaft in an appropriate direction. Clutch 117 embodies a clutch member 119 slidably and non-rotatably secured to shaft 115 and a second clutch member 120, co-operating with clutch member 119 and rotatably but non-slidably secured to said shaft. Clutch 118 embodies corresponding members 121 and 122, the first member being slidably but non-rotatably secured to shaft 105 and the second member 122 being rotatably secured to said shaft. The clutch member 119 of clutch 117 carries a gear 123, which continuously meshes with gear 49. The shifting of the slidable clutch member 119 into engagement with clutch member 120 couples shaft 105 through gear 49 with shaft 42 or reduction unit R. Clutch member 121 of shiftable clutch 118 carries a gear 124, which is coupled with the idler gear 89 by means of gear 41 on shaft 42 of reduction unit R.

It can readily be seen that when clutch 117 is shifted, shaft 105 is turned in one direction and that when clutch 118 is shifted said shaft is turned in an opposite direction. Shifting of clutch members 119 and 122 of the respective clutches 117 and 118 is accomplished by means of a suitably supported fork-shaped operating mechanism R'. This operating mechanism includes a vertical shaft 126, which is rotatably mounted at one end in frame A, as at 125, and at its other end rotatably supported in bracket 90. Shaft 126 carries two lever arms 127, provided with pins 128 at their free end portions, engaging with recess 129 of a sleeve member 130, slidably mounted on shaft 105. A forked lever arm 131 at the lower end of shaft 126 is pivotally connected by means of a link 131' with the middle portion of a horizontally shiftable connecting bar 132 which in turn engages with its twisted right end 133 the downwardly extending arm 134 of a bell crank 135, pivotally supported in frame A. The free arm 136 of bell crank 135 extends through a slot 137 in front wall 23 of frame A and carries a handle 138 for manual operation of clutches 117—118 respectively, in an obvious manner.

The twisted left end of bar 132 engages a short lever arm 139 mounted on a short horizontal shaft 140 journaled in bearing 141 of frame A. The opposite end of shaft 140 carries a second lever arm 132, pivotally connected with the forked end 144 of a vertical rod 145, which extends slidably through frame A, and the perforated extension 146 of a bracket 147 rigidly mounted on the screw-threaded end portion 112 of rod 113, close to the lower end thereof. Rod 145 carries at opposite sides of extension 146 longitudinally shiftable collars 148, held in proper place by set screws 149. These collars 148 are set to engage extension 146 shortly before presser foot S is raised or lowered to its limit of movement thereby automatically and forcibly disconnecting clutch member 121 and clutch member 122 respectively. When collars 148 force rod 145 upwardly or downwardly, horizontal bar 132 is shifted and its link 131' in turn is caused to actuate the mechanism R' for shifting clutches 117—118. It should be noted that these clutches will be readily disconnected if the operator accidentally or negligently fails to release handle 138 for operating the mechanism R'.

Primarily to actually applying a patch the inner wall of the tire is usually cleansed and buffed. To facilitate this operation, a buffing wheel W is provided, which wheel is connected to one end of a flexible conduit and driving shaft D, the opposite end of which is detachably coupled to a spring-pressed clutch member 150, axially aligned with worm drive shaft 43. Clutch member 150 is actuated by a tiltable fork-shaped operating mechanism 151, controlled through a lever and bell crank mechanism 152 by a lever 153, pivotally mounted in frame A and extending with its free end through a slot 154 in front wall 23 of frame A, a handle 155 being provided for convenient manual operation.

The machine also embodies a switch member 156 for starting and stopping the electric motor M connectible with a source of electricity through wire 157. A lamp 160 mounted on a post or standard 158 is provided for an obvious purpose.

What we claim, is:

1. A tire machine, including a pair of driving rollers adapted to seat and revolve a tire having a divided base portion, oscillatory devices for spreading and releasing the divided base portion of the tire, means for revolving said rollers and the tire, means centrally disposed in respect to said pair of tire revolving and tire spreading means adapted to bulge said tire inwardly when spread open, separate clutching means for selective operation of each of said revolving, spreading, and bulging means in clockwise or anti-clockwise direction, and a power unit adapted to be coupled with each of said means.

2. A tire machine comprising a power unit, a set of revoluble rollers driven by said unit and adapted to seat a split tire, separate sets of oscillatory levers having hinged arms adapted to be placed in overhanging relation with said rollers and split tire, rocking shafts for said levers and means to rock said shafts, including shiftable coupling means and gearing associated with said rocking shafts and said power unit for selectively rocking said shafts in opposite directions, and automatically actuated tripping means to disconnect said clutching means when said rocking shafts are rocked to predetermined positions.

3. A tire machine comprising a pair of revoluble rollers, separate sets of tire spreading devices adapted to spread the divided base portion of a tire, vertically shiftable means centrally disposed in respect to said pair of rollers and said sets of tire spreading devices adapted to bulge said tire inwardly in that portion of its area held between said tire spreading devices, a power unit for operating said bulging means, shiftable coupling means and gearing for controlling the upward and downward movement of said bulging means, and automatically actuated tripping means to disconnect said power unit from said bulging means when said bulging means has moved a predetermined distance.

4. A tire machine comprising a pair of revoluble rollers for seating and revolving a split tire, a motor driven means for revolving said rollers, means associated with said rollers for spreading a split tire while coincidently pressing the tire automatically against said rollers, means to couple said spreading means with said motor, and tripping means for disconnecting said coupling means at predetermined positions of said spreading means.

5. A tire machine, comprising a pair of revoluble rollers, separate sets of tire spreading devices, adapted to spread the divided base portion of a tire, a vertically shiftable pressure foot centrally disposed in respect to said pair of rollers and said sets of tire spreading devices, a screw-threaded shifting rod for said pressure foot, a rotatable nut engaging the theaded portion of said rod, a power unit for rotating said nut in clockwise and anti-clockwise directions, and shiftable coupling means and gearing selectively coupling said nut with said power unit for changing the direction of rotation of said nut, said coupling means including automatically actuated means for disconnecting the coupling between said power unit and said nut in predetermined positions of said presser foot.

6. A tire machine, comprising a pair of revoluble rollers for seating and revolving a split tire, motor driven means for revolving said rollers in clockwise and anti-clockwise direction, and a pair of clutches controlling the selective operation of said means and selective rotation of said rollers.

7. A tire machine, comprising a pair of revoluble rollers for seating and revolving a split tire, power actuated means for revolving said rollers, means associated with said power actuated means for engaging and spreading the split portions of a tire seated upon said rollers, shiftable coupling means between said power actuated means and said spreading means, and tripping means for automatically disconnecting said coupling means at predetermined positions of said spreading means.

8. A tire machine, comprising a pair of revoluble rollers for seating and revolving a split tire, power actuated means for revolving said rollers, means associated with said power actuated means for engaging and spreading the split portions of a tire seated upon said rollers, coupling means between said power actuated means and said spreading means, manually actuated operating means for said coupling means and tripping means associated with said operating means for automatically disconnecting said coupling means at predetermined positions of said spreading means.

9. A tire machine, comprising a pair of revoluble rollers for seating and revolving a split tire, motor driven means for revolving said rollers, oscillating means associated with said motor driven means for engaging and spreading the split portions of a tire seated upon said rollers, a pair of clutches controlling the operation of said oscillatory means through said motor driven means, and tripping means associated with said clutches for automatically disconnecting said clutches at predetermined positions of said spreading means.

10. A tire machine, comprising a pair of revoluble rollers for seating and revolving a split tire, motor driven means for revolving said rollers, oscillating means associated with said motor driven means for engaging and spreading the split portions of a tire seated upon said rollers, vertically shiftable reciprocatory means associated with said motor driven means to buckle said tire inwardly when spread by said oscillatory means, a pair of clutches controlling the operation of said reciprocatory means and tripping means associated with said clutches for automatically disconnecting said clutches at predetermined positions of said spreading means.

11. A tire machine, comprising a pair of revoluble rollers for seating and revolving a split tire, motor driven means for revolving said rollers, oscillatory means associated with said motor driven means for engaging and spreading the split portions of a tire seated upon said rollers, a pair of controlling clutches for said oscillatory means, mechanism for manually actuating either of said clutches, reciprocatory means associated with said motor driven means to buckle said tire inwardly while spread by said oscillatory means, a pair of controlling clutches for said reciprocatory means, mechanism for manually actuating either of said second pair of clutches and tripping means for each of said pair of clutches for automatically disconnecting said clutches at predetermined positions of said spreading means.

12. A tire machine, comprising a pair of revoluble rollers for seating and revolving a split tire, power actuated means for revolving said rollers, and means associated with said power actuated means for engaging and spreading the split portions of a tire seated upon said rollers, said means including a left and right-handed screw member co-operating with a pair of nut members shiftably engaged with opposite ends thereof and a pair of rocking shafts linked to said nut members.

13. A tire machine according to claim 12, including means to axially shift said screw member for adjustment of said nut members with respect to each other.

14. A tire machine, comprising a frame, a pair of rollers for seating and revolving a split tire rotatably mounted within said frame, power actuated means for revolving said rollers, and means associated with said power actuated means for engaging and spreading the split portions of a tire seated upon said rollers, said means including an axially shiftable and rotatable member having left and right-handed threads at opposite ends thereof and means to adjustably hold said member against axial shifting.

15. A tire machine, comprising a frame, a pair of rollers for seating and revolving a split tire rotatably mounted within said frame, power actuated means for revolving said rollers, means for engaging and spreading the split portions of a tire seated upon said rollers, a pair of rock shafts for actuating said spreading means, a rotatable member having left and right-handed threads coupled with said rock shafts and coupling and gearing means between said power actuated means and said rotatable member for selective rotation of said rotatable member.

16. A tire machine, comprising a frame, a pair of rollers for seating and revolving a split tire rotatably mounted within said frame, power actuated means for revolving said rollers, means for engaging and spreading the split portions of a tire seated upon said rollers, a pair of rock shafts for actuating said spreading means, a rotatable member having left and right-handed threads, a pair of shiftable members screw-engaged with opposite ends of said rotatable member, coupling means between said shiftable members and said rock shafts, and selective coupling means between said power actuated means and said rotatable member for revolving said member in clock and anti-clockwise direction.

17. A tire machine according to claim 16 including manually-actuated operating means for said selective coupling means between said power actuated means and said rotatable member and tripping means for said operating means coupled with one of said shiftable members for automatically disconnecting said selective coupling means at predetermined positions of said spreading means.

WILLIAM G. PRENTICE.
FRANK B. COPELAND.